United States Patent [19]

Eberle

[11] 4,168,772

[45] Sep. 25, 1979

[54] APPARATUS AND METHOD FOR STACKING BATTERY PLATES AND SEPARATORS

[75] Inventor: William J. Eberle, Reading, Pa.

[73] Assignee: General Battery Corporation, Reading, Pa.

[21] Appl. No.: 701,814

[22] Filed: Jul. 1, 1976

Related U.S. Application Data

[63] Continuation-in-part of Ser. No. 511,054, Oct. 1, 1974, Pat. No. 3,982,624.

[51] Int. Cl.² .................. B65G 59/00; B65G 60/00
[52] U.S. Cl. ......................... 198/421; 29/730; 221/251; 221/211; 271/9; 271/30 A; 271/104
[58] Field of Search ............... 198/420, 421, 422, 491, 198/689; 271/9, 12, 30 A, 104, 107, 146, 149, 162, 166, 167, 169; 214/1 BS, 1 BV; 29/204 R, 730; 302/27; 221/93, 176, 211, 251

[56] References Cited

U.S. PATENT DOCUMENTS

| 1,993,240 | 3/1935 | Ciolino .................... 271/12 |
| 2,352,088 | 6/1944 | Evans ...................... 271/9 |
| 2,704,593 | 3/1955 | Galloway ................ 198/421 |
| 2,790,536 | 4/1957 | Reed ....................... 198/421 |
| 3,166,206 | 1/1965 | Porter et al. .......... 271/9 X |
| 3,334,891 | 8/1967 | Clausen et al. ....... 271/9 |
| 3,511,395 | 5/1970 | Brown, Jr. ............. 214/8.5 D |
| 3,527,367 | 9/1970 | Bivans .................... 214/8.5 D |
| 3,598,399 | 8/1971 | Cottrell .................. 271/146 |
| 3,612,251 | 10/1971 | Gory et al. ............. 198/492 |
| 3,633,731 | 1/1972 | Jones ...................... 198/689 |
| 3,978,571 | 9/1976 | Orlando et al. ....... 29/204 R |

FOREIGN PATENT DOCUMENTS 1183915 12/1964 Fed. Rep. of Germany ......... 271/146

OTHER PUBLICATIONS

H. del Cano and M. Jakubowski, "Paper Document Separator Using Fluffing Hopper," IBM Tech. Disclosure Bulletin, vol. 12, No. 11, 4–70.

Primary Examiner—Joseph E. Valenza
Attorney, Agent, or Firm—Benasutti Associates, Ltd.

[57] ABSTRACT

Battery plate elements and separator elements are maintained in racks along opposite sides of a conveyor. Pivotally swingable vacuum pickup heads serve to withdraw plates and separators from their racks and deposit them onto the conveyor. A plurality of plates or separators are withdrawn simultaneously, and the conveyor is indexed from withdrawal station to withdrawal station for stacking the plates and separators one upon the other, alternately, whereby at any given time a plurality of plate and separator sandwiches are being formed, in different progressive stages. Capability is provided for adjustments for handling different sized plates and separators as well as the number of elements in a given stack. Synchronous drive means and adjustable vacuum means are disclosed.

21 Claims, 17 Drawing Figures

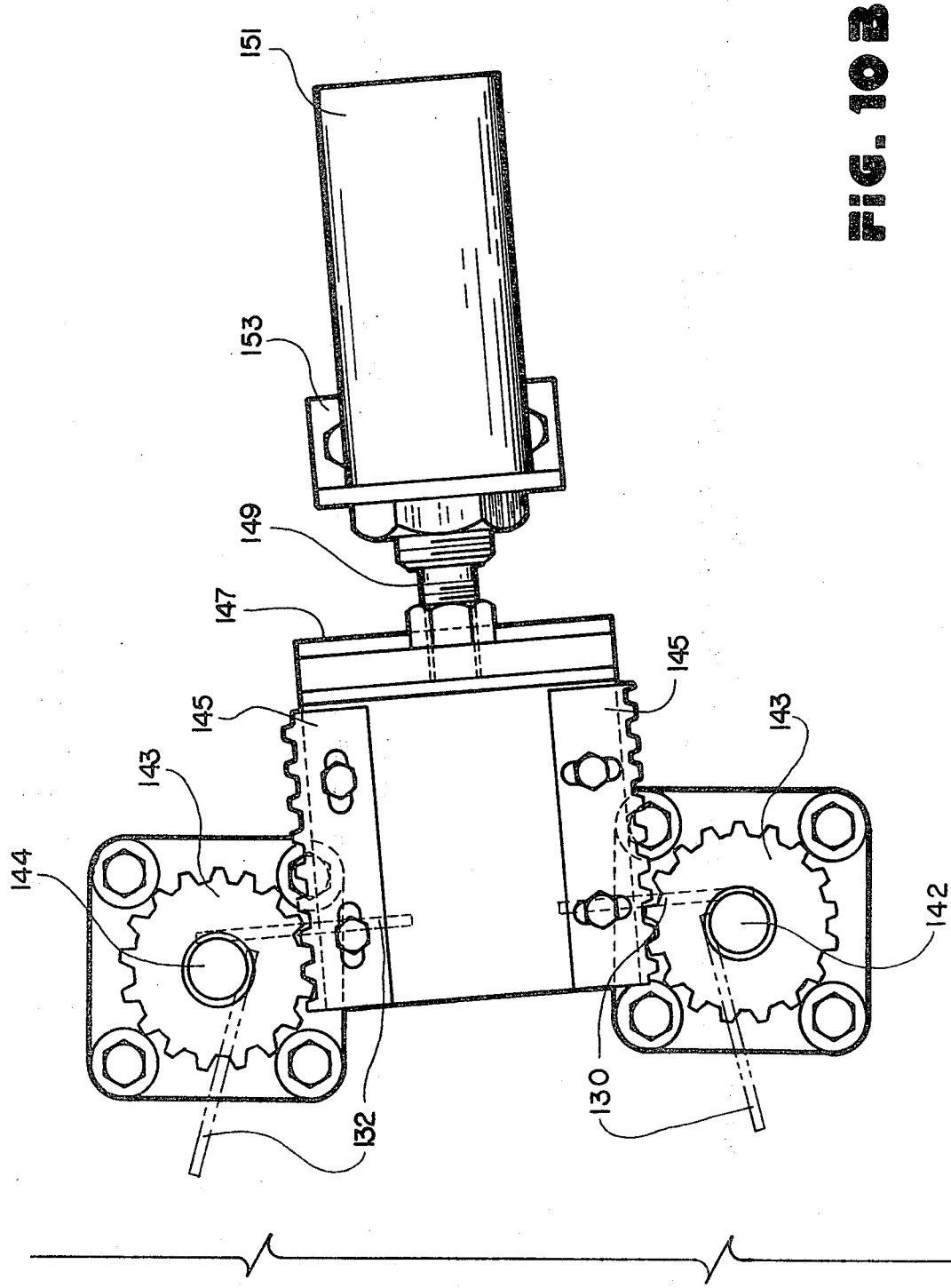

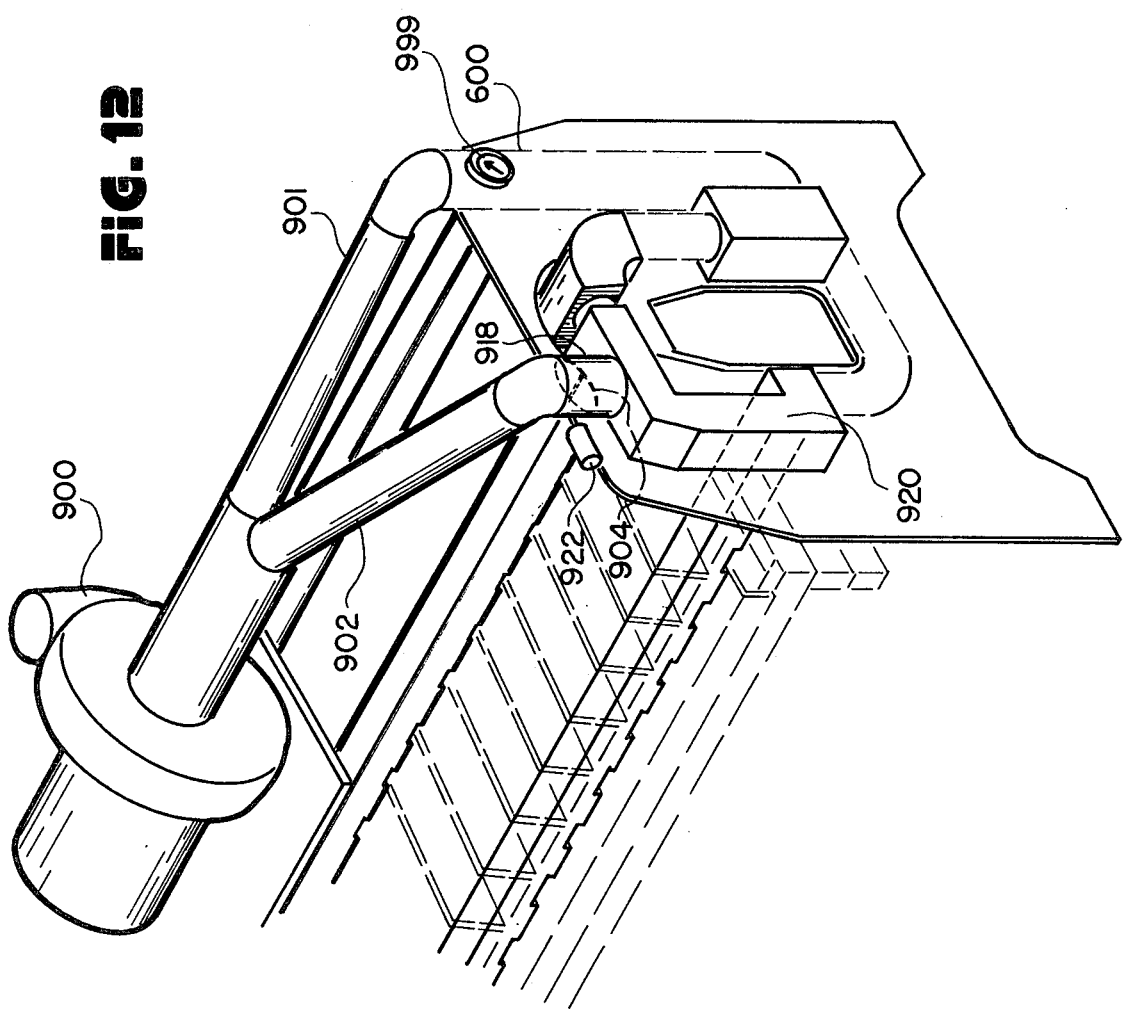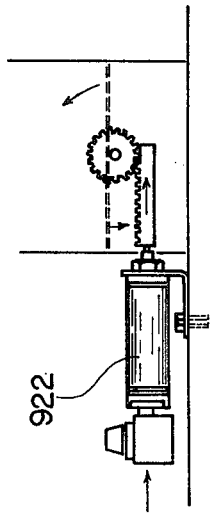

APPARATUS AND METHOD FOR STACKING BATTERY PLATES AND SEPARATORS

CROSS-REFERENCE TO RELATED APPLICATIONS

This application is a continuation-in-part of my prior copending application, Ser. No. 511,054, filed Oct. 1, 1974, entitled APPARATUS AND METHOD FOR HANDLING AND STACKING BATTERY PLATES AND THE LIKE, now U.S. Pat. No. 3,982,624 dated Sept. 28, 1976 and discloses and claims in part the subject matter disclosed and claimed therein; said application being incorporated herein by reference.

BACKGROUND OF THE INVENTION

In each cell of a lead acid storage battery, there is a group of elements known as a battery plate group. This group consists of a sandwich-like arrangement of lead plates and porous separators arranged alternately. The present invention relates to the initial stacking of these elements.

In the battery making art, the assembling of battery plates and separators for forming into groups and subsequent disposition into battery cells has, for a long time, been accomplished by hand. Such manual assembly techniques have not always been satisfactory, due, for example, to the possibilities of human error in stacking assemblies having either too many or too few plates. In other instances, the separators may be provided in inadvertently inverted form; a condition which may not be detected until a much later stage of battery assembly, or even thereafter, wherein detection only comes to light as an incidence of battery malfunction.

In the more recent past, apparatus and techniques have been proposed for mechanically handling battery elements, particularly battery plates, and in some instances the separators that are used for disposition between the plates, whereby stacks of alternate plates and separators are to be deposited onto a conveyor. Some proposed techniques have involved strike arm mechanical feeders, whereby an arm, lever or the like, would directly engage the plates or separators and push them out of a hopper onto a conveyor. The use of such techniques, would risk the possibility of damage to the rather fragile plates, and even to the separators. This is particularly true as the plates become thinner and thinner; particularly in the case of separators wherein advances in material construction permit the use of separators far thinner than separators heretofore used. By mechanically striking a separator or plate from the bottom of a hopper and causing the same to be ejected onto a conveyor, not only would limitations be imposed upon the type of plates and separators that are susceptible to such treatment, but physical damage to the materials being handled would, most like, be encountered.

SUMMARY OF THE INVENTION

Vacuum withdrawal means are provided for withdrawing plates and separators from their stations by bringing vacuum heads close to, but avoiding the touching of, the plates or separators that are desired to be withdrawn. The plate or separator is withdrawn from the source and is then deposited onto a conveyor. The conveyor is then indexed to a subsequent station.

The vacuum withdrawal is alternated between plates and separators at many stations, such that a stack is formed on the conveyor as the initially deposited element progresses from station to station, and another plate or separator (as the case may be) is deposited onto the stack. There is simultaneous withdrawal and deposition of plates and separators to form stacks. Thus, as the conveyor indexes from station-to-station, stacks are continually built up of alternate plates and separators.

The present invention is directed to providing a novel apparatus that is mechanized for quick change, for purposes of providing versatility to the apparatus, whereby when it is desired to change from one plate-separator size to another, such changes may rapidly be effected; and whereby, when it is desired to change to battery plate sandwiches having different numbers of plates, these changes may also be rapidly effected.

Further, I provide an apparatus and method whereby the assembly is completely mechanized, whereby plates and separators may be extracted from sources and stacked in precisely the number desired for a given battery cell size, and wherein such stacking is with great precision. Also, in accordance with the present invention, many sandwiches of battery plate and separator elements may be undergoing assembly concurrently.

By means of the present invention, plates and separators are withdrawn from their sources by vacuum withdrawal techniques, whereby such articles may be picked up with precision, without picking up more than one such article from the same source at the same time. It is recognized that techniques may have been developed for vacuum pick up of articles. However, the present invention is addressed to providing a novel technique whereby vacuum picking up can be accomplished with respect to battery plate and separator elements, both of which have different physical properties, such as different degrees of porosity. The present invention provides a technique whereby the negative pressure causes a single plate or separator in each instance to be withdrawn into engagement with the vacuum head for disposition onto a conveyor.

It is a primary object of the present invention to provide a novel apparatus and method for stacking battery separators and plates alternately and automatically, by use of vacuum withdrawal from sources of the elements, effected by bringing the vacuum pick up means into sufficiently close non-touching proximity to the surfaces of elements that are to be withdrawn, that the element to be withdrawn jumps from its source station into touching engagement with the vacuum pick up means, and therefore is deposited in the stack being formed.

It is another object of this invention to provide a novel battery plate and separator sandwich assembly apparatus wherein a number of stations are provided in the apparatus; with facility being provided for easily using only those stations that are needed to effect the assembly of sandwiches of a desired number of plates and elements.

It is a further object of this invention to accomplish the several objects set forth above, wherein adjustment is provided for easily accommodating different sized plates and separators.

It is a further object of the present invention to provide apparatus having different manners of fine adjustment, different manners of control, and efficient adjustment capabilities.

Other objects and advantages of the present invention will be readily apparent to those skilled in the art from a reading of the brief figure descriptions, and detailed description of the preferred embodiment, and the appended claims, as well as elsewhere herein.

BRIEF DESCRIPTION OF THE DRAWINGS

FIG. 7a is an enlarged end view taken as indicated by the lines and arrows 7a—7a in FIG. 7;

FIG. 12 is a perspective view of selected portions of the apparatus, with certain portions shown in phantom lines;

FIG. 13 is a view similar to FIG. 12, showing certain details with parts removed.

DESCRIPTION OF THE PREFERRED EMBODIMENTS

Figure 1:
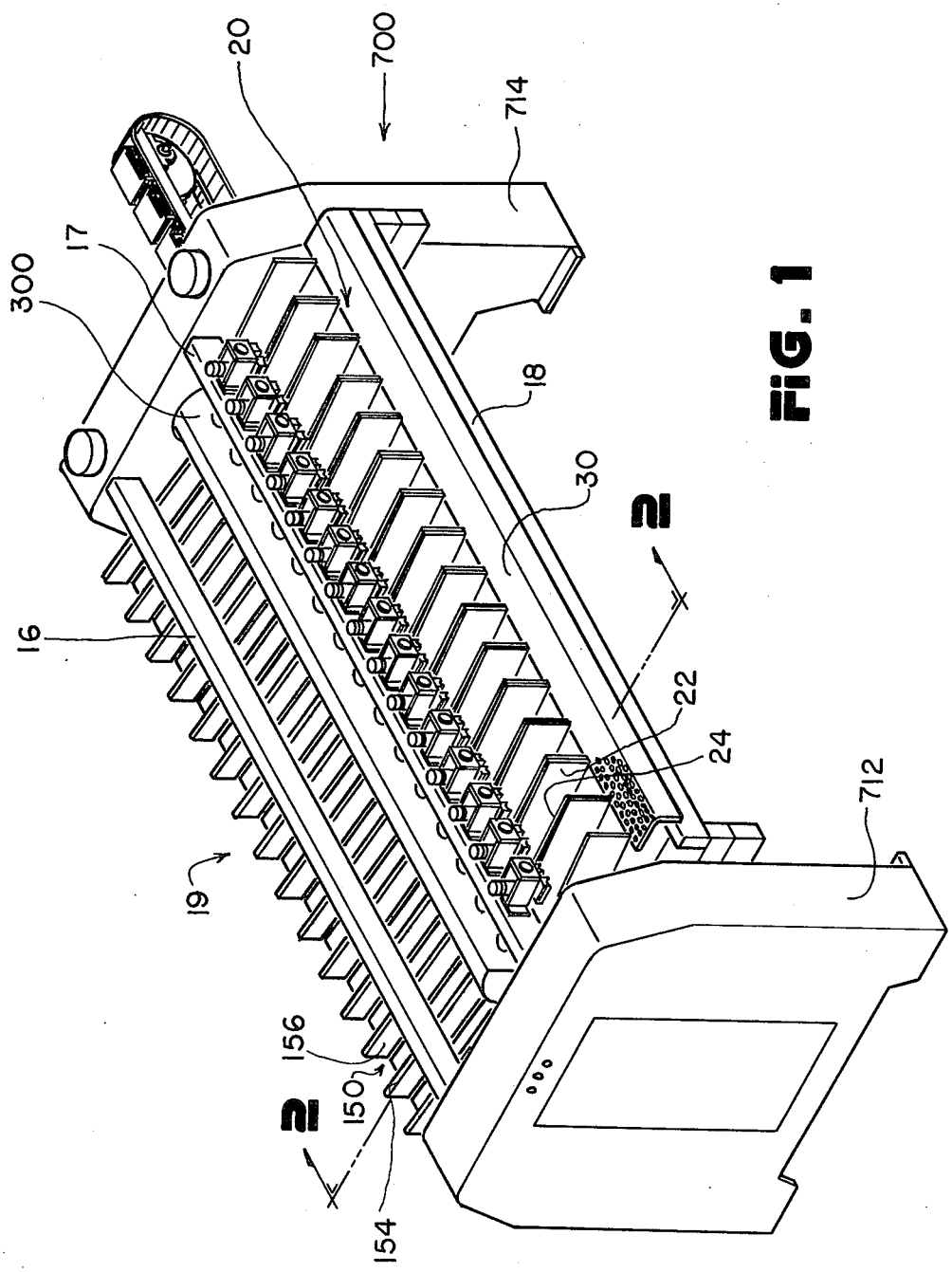
FIG. 1 is a perspective view of an apparatus in accordance with the preferred embodiment of my invention.

Although specific forms of the invention have been selected for illustration in the drawings, and the following description is drawn in specific terms for the purpose of describing these forms of the invention, this description is not intended to limit the scope of the invention which is defined in the appended claims.

Referring to the figures, FIG. 1 shows a perspective view of an apparatus in accordance with the preferred embodiment of my invention, designated generally 700 and comprising base frame end housings 712 and 714 which structurally support the apparatus and have mounted therebetween, longitudinal structural support members such as the beams 16, 17 and 18. In this perspective view, the left-hand side has a plurality of chutes or racks designated generally 19, and the right-hand side has a plurality of chutes or racks designated generally 20. The chutes on the left-hand side form racks for battery separators and those on the right-hand side form racks for battery plates. Both plates and separators will hereinafter be referred to generally as "elements". Each chute forms a station at its discharge end for presentation of a battery element to a vacuum head.

The chutes designated 20 have vertical sides which not only tilt downwardly, but also angle inwardly toward one another at their discharge ends. The side of each chute is attached to the side of the next chute at the end most remote from the longitudinal axis of the apparatus as by means of welding. The ends of these two sides are attached to a spacer block positioned therebetween at the ends thereof which are closest to the longitudinal axis of the machine. Thus, each chute is tapered toward the longitudinal axis of the apparatus. This spacer block is not shown in detail, but will be apparent from what has been described.

Figure 2:
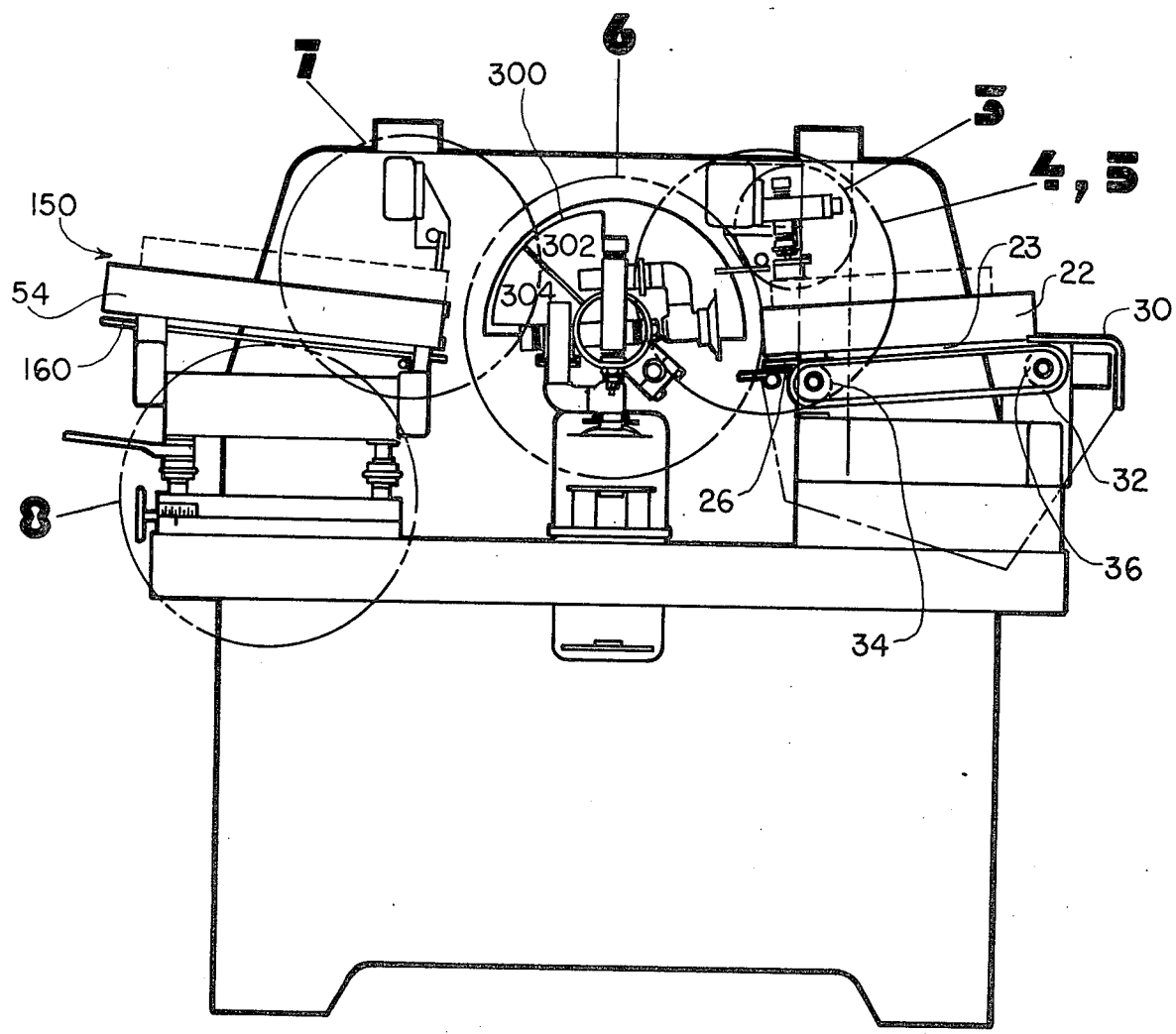
FIG. 2 is a view on an enlarged scale taken as indicated by the lines and arrows 2—2 in FIG. 1, and showing in circled portions, the subject matter of FIGS. 3 through 8.
Figure 3:
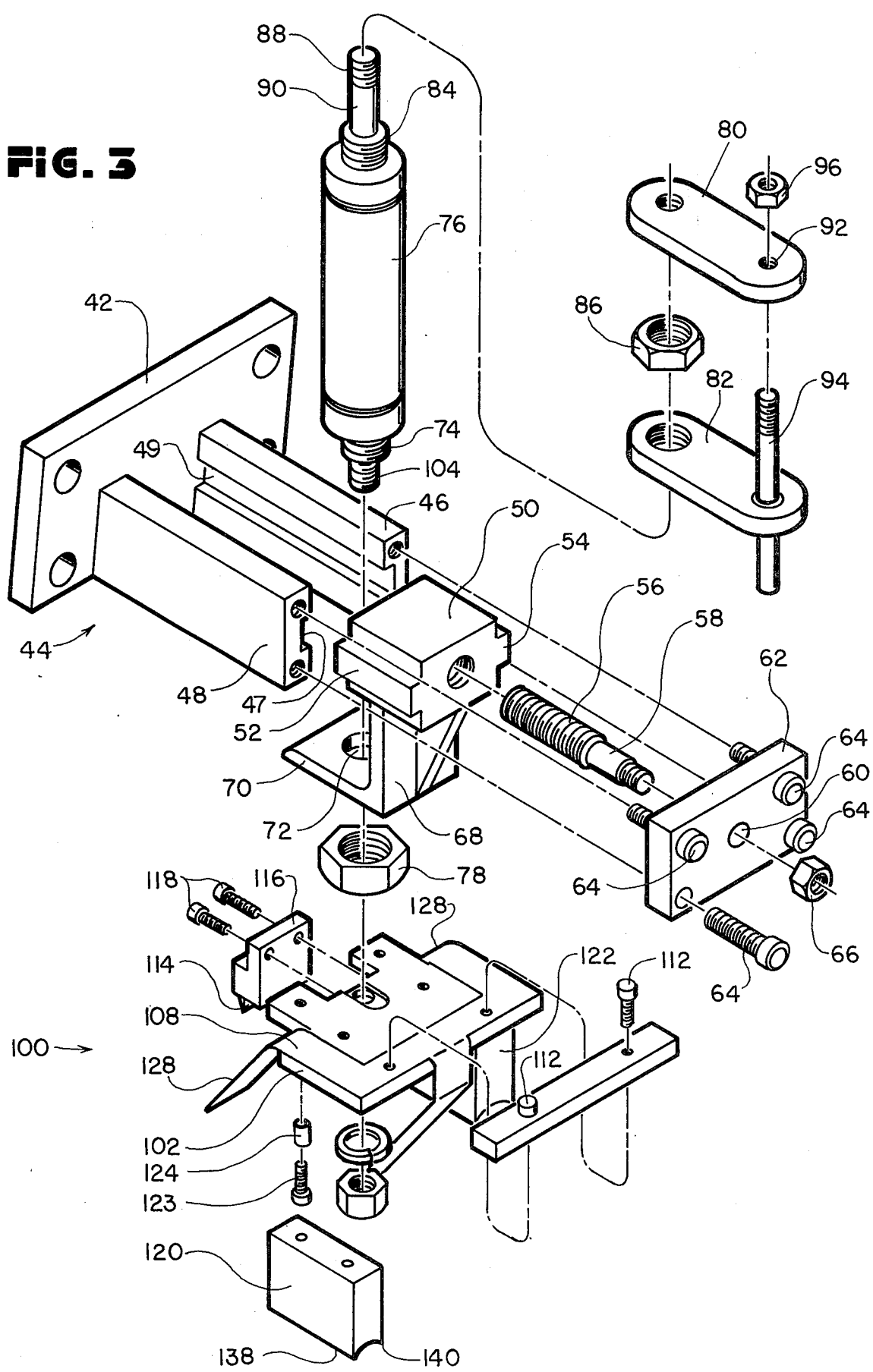
FIG. 3 is a further enlarged exploded view of the portion designated 3 in FIG. 2, shown in perspective from the right rear side.
Figure 4:
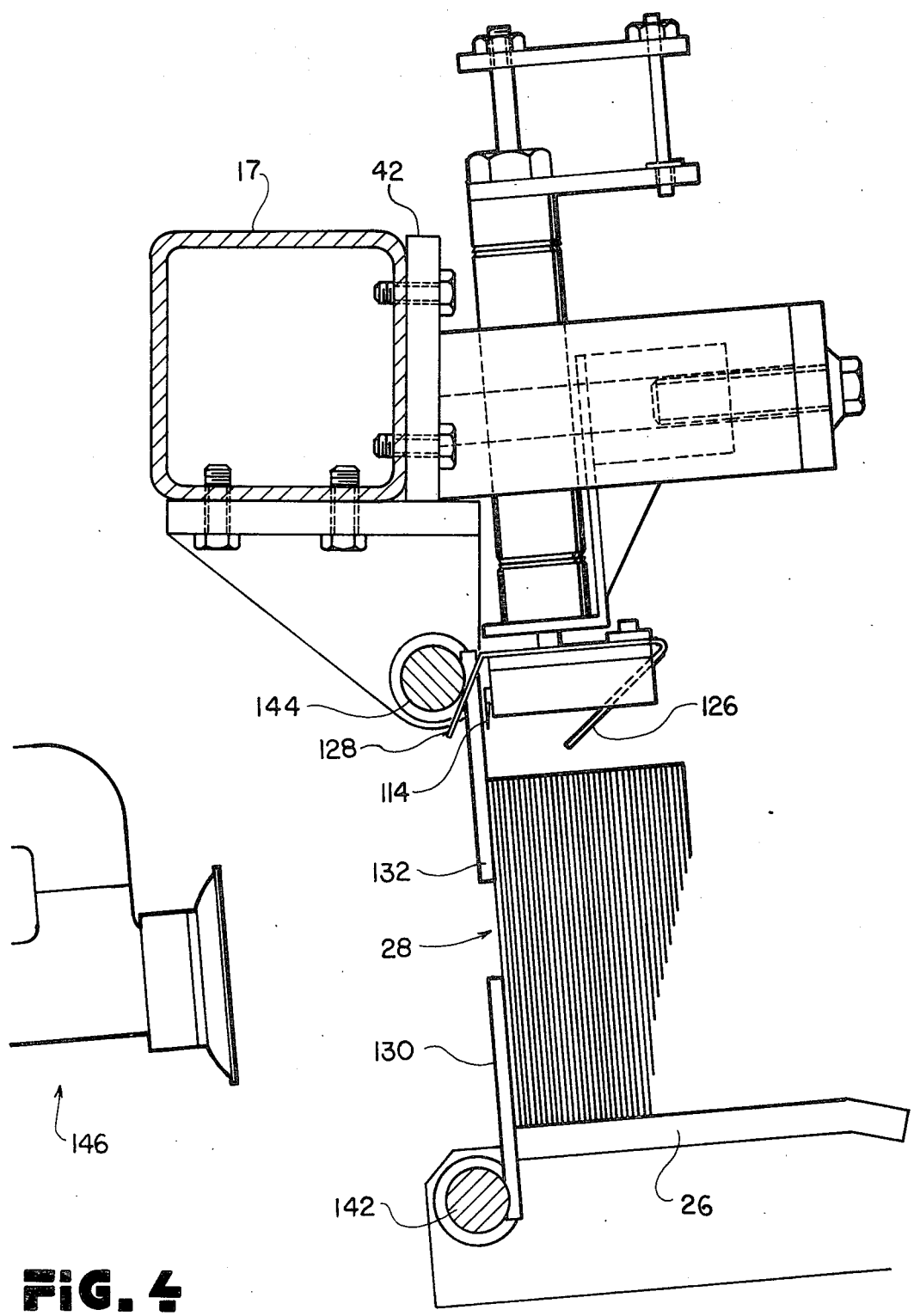
FIG. 4 is an enlarged partial side view shown partially in section of the portion of the apparatus designated 4 encircled in FIG. 2.

Considering FIG. 1 with particular reference to FIGS. 2, 3, 4 and 5, I will now describe the portion of the apparatus concerned with the retaining, advancement and disposition of the battery plate elements as they are moved into ultimate engagement with the vacuum head at a particular station. The station shown is along the line 2—2 in FIG. 1. All of the stations on the right-hand side are identical, in accordance with this preferred embodiment. In addition to the sidewalls 22 and 24 of FIG. 1, the chute has a bottom plate 26 (FIGS. 2 and 4), upon which a plurality of battery plate elements, designated generally 28, (FIG. 4; shown partially broken away). The sidewall, such as the wall 22, is fixedly positioned above the plate 26 so that there is a space 23 therebetween, the function of which will be more fully described hereinafter.

At the outward end of the chute, there is an L-shaped deck 30, which runs substantially the length of the machine as shown in FIG. 1, and which is perforated. This deck extends outwardly as shown in section in FIG. 2 and serves as a means whereby an operator can manually shake down into a fairly regular stack, a plurality of battery plates prior to inserting them into the chute. The chute itself is on a slight angle to the horizontal as shown in FIG. 2 and tilts inwardly toward the center of the apparatus.

The plate 26 does not bridge the entire gap between the sidewalls 22 and 24, but rather, there is a space on both sides of the plate between these walls. In this space, on each side, there is a chain link mechanism comprising a chain 32 disposed about sprockets 34 and 36 (FIG. 2) driven (counterclockwise, when viewed as in FIG. 2) by any suitable means (not shown) connected to shafts upon which the sprockets are mounted. Reference is made to my prior copending application referenced above, now U.S. Pat. No. 3,982,624, for a more detailed description of this chain. The chain is elevated above the plate 26 a distance sufficient to engage the bottom edges of the plates 28 and advance those plates as it is advanced toward the longitudinal axis of the apparatus. The two stacking chains thus provided in each stacking chute for advancing the plates, advance one increment during each cycle of the machine. The cycles will be described more fully hereinafter. The plates are advanced to a discharge end of the chute which may be referred to as an escapement area or station; that is, the place at which the plate will escape from or be discharged from the chute and jump onto the vacuum head which has been moved into close proximity, but non-touching relationship to it. The mechanism for controlling the egress of the plate from the chute will now be described in greater detail.

Running longitudinally through the machine is a beam 17 supported at its longitudinal ends to the base members 712, 714. This is a principal, structural member of the machine and serves to support numerous other members. One member so supported is the bracket 42, FIG. 3, which has extending therefrom a channel-shaped slide mechanism, designated generally 44 of FIG. 3. This mechanism has side members 46, 48 which have longitudinally extending slots 47, 49 (FIG. 3). Mounted therein is a slide 50 having ears 52 and 54 for slidingly engaging the slots 47 and 49 respectively. A threaded shouldered stud 56 is threadedly engaged in the slide 54 and positioned so that its reduced diameter cylindrical section 58 is free to slide in a hole 60 in a cover plate 62, which is fixedly attached by means of the bolts 64 to the longitudinal ends of the side members 46 and 48. An adjusting nut 66 threadingly engages the end of the stud 56. By means of this arrangement, it will be readily apparent that turning the stud 56 will advance or retract the slide 50 longitudinally along the members 46 and 48.

The downwardly depending support bracket 68 is fixedly formed with the slide 50 so that it moves therewith. This support bracket has an inwardly depending flange 70 with a hole 72 therethrough. Passing through that hole, is the threaded portion 74 of the housing of a cylinder 76. This threaded portion is engaged by a retaining nut 78 to mount the air cylinder 76 to the slide 50. In order to prevent this air cylinder from rotating about its axis, an outrigger mechanism is provided. This mechanism comprises two ridged links 80 and 82. The bottom link 82 is in threaded engagement with the upper threaded portion 84 of the housing of the air cylinder and is retained thereon by a nut 86. The upper link 80 is in threaded engagement with a reduced threaded terminal end 88 of the extending piston shaft 90; which forms part of the piston which operates within the cylinder 76. At a portion of the link remote from its connection to the portion 88, there is a threaded hole 92, through which is treadedly engaged a shaft 94, which in turn is fixedly retained by a nut 96. At the same distance from the axis of the piston rod 90, along the link 82, there is a hole for sliding engagement with the outer surface of the shaft 94. By comparing the arrangement of FIG. 3 with the arrangement of FIGS. 4 and 5, it will be readily apparent that the link 82 is maintained in fixed relationship with the housing of the cylinder 76 and thus as the piston shaft 90 moves up and down in the cylinder, it is restrained from rotating therein by means of the outrigger and the shaft 94 which is fixedly engaged to the link 80 and which moves up and down through the link 82.

The arrangement above described is for the purpose of maintaining the accurate disposition of the control head designated generally 100 in FIG. 3. This control head comprises a mounting plate 102, which is threadedly engaged with the threaded end 104 of the movable piston shaft in the cylinder 76, and which is retained by the lock washer and nut 105 and 106. This mounting plate supports a multi-fingered leaf spring 108, which is retained thereon by means of the bar 110 and screws 112. It also supports a locating knife edge 114 which is formed with or mounted on a block 116, retained by screws 118 to the plate 102. Finally, it supports two rubber engaging blocks or pads 120 and 122 by any suitable means such as the bolts and spacers 123 and 124, respectively.

Figure 5:
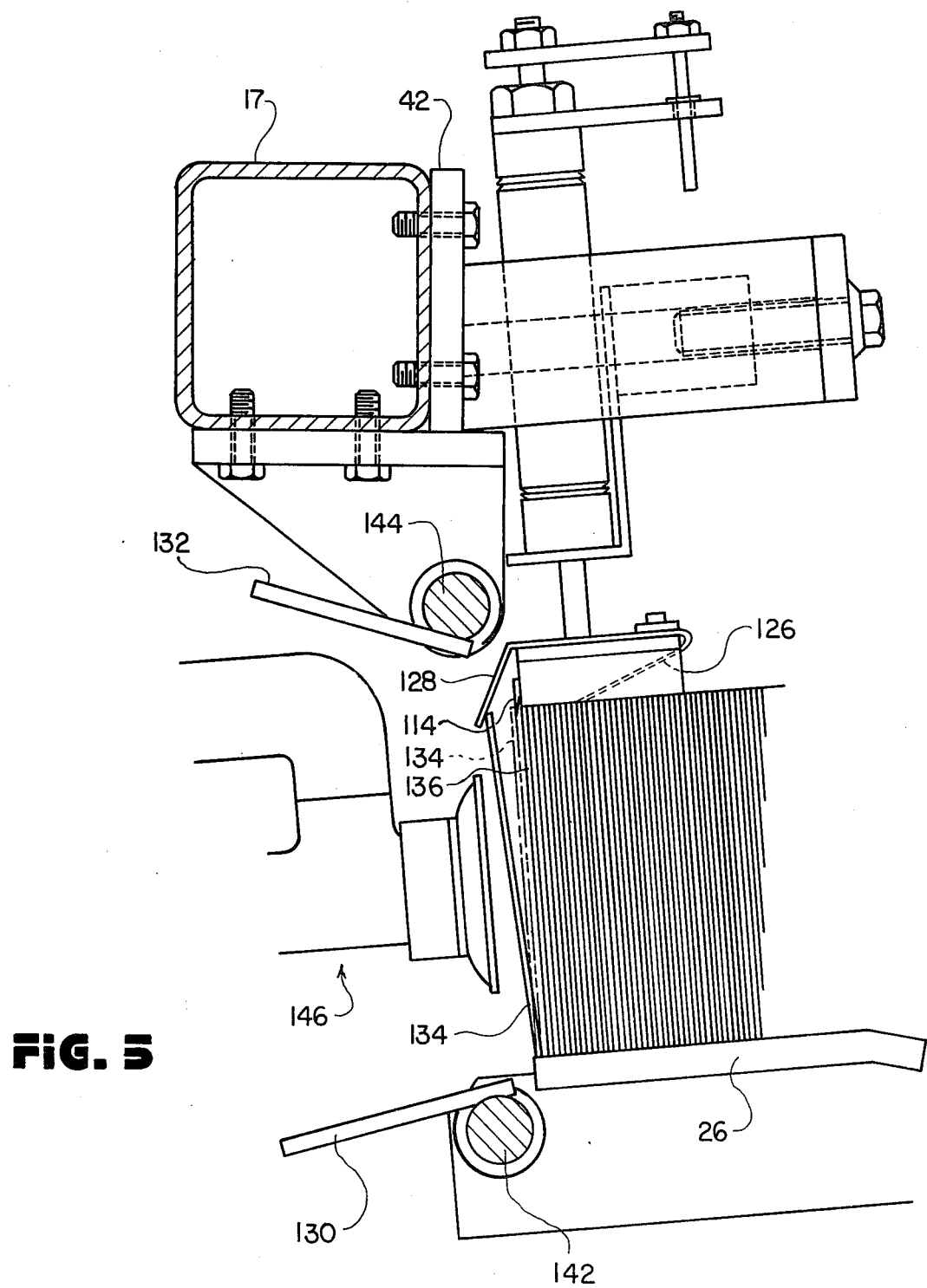
FIG. 5 is a view similar to FIG. 4 showing the apparatus in an alternate position.

The functions of the depending fingers, the knife edge, and the blocks will be more fully described with particular reference to FIGS. 4 and 5. In FIG. 4, the apparatus is shown partially in section and viewed on a plane transverse to the longitudinal axis of the apparatus. Therein, it will be noted that the rear finger 126 depends downwardly towards the upper edge of the plates 28, a greater distance than either the front fingers 128 or the knife edge separator 114. It will be noted that although not completely visible, there is a second finger 128 along the opposite edge of the leaf spring 108, the upper surface of which can be viewed in FIG. 3 so that the two fingers 128 depend in a fork-like fashion toward the plane of the upper edge of the plates 28. Between this fork is the depending knife edge separator 114.

As the piston within the cylinder 76 descends, the leading free edge of the spring finger 126 is first to engage the upper edge of the plates at a point at which there are perhaps a dozen plates between the discharge end of the chute and the spring. As the piston continues to descend toward the plates, the spring is bent or bowed in such a manner that it forces the plates forward against the retaining fingers 130 and 132 and in positive registry with them. This is necessary, in part, because plates are to a slight extent, tapered, when viewed in vertical section, so that the bottoms are slightly wider than the tops. Thus, even though the plates are uniformly advanced, the tops are not necessarily uniformly spaced from one another, or in engagement with one another until they are pushed into engagement with one another by the spring finger 126.

As the piston continues to advance, the spring fingers 128 assume a position of overlying the front face of the lead plate, which is to be discharged from the chute.

As the piston continues to advance, the leading edge of the knife-like separator finger 114 advances to a position between the rear of the outermost (that is the most advanced) plate (such as the plate 134, shown in phantom lines in FIG. 5) and the next plate in line (such as the plate 136).

As the piston continues to advance, the knife-like edge 114 is driven down between the first and second plates and eventually the longitudinal edges 138 and 140 of the resilient member 120 (and indeed of the resilient member 122 on the opposite side) engage the upper edges of the plates and a back pressure begins to build in the piston as further resistance to advancement is met. In this regard it is noted that the undersides of the members 120, 122 are concave to allow for reasonable flexibility and to prevent excessive pressure and damage to the plate tops. Note that the pads 120, 122 do not engage the top of the first plate in line. When a predetermined pressure is reached, further advancement of the piston is prevented.

Since the piston is mounted above the plates, its stroke is such that it will accommodate the highest plates, and yet still come down low enough to engage the shortest plates anticipated. The plate elements are now ready to have the lead plate removed by vacuum action. Shafts 142 and 144 are longitudinally mounted through the machine for rotation in bearings in response to a drive mechanism. Upon appropriate rotation of the shafts, the holed back fingers 130 and 132, respectively, are moved from the position shown in FIG. 4 to the position shown in FIG. 5, thereby moving out of interferring relation with the lead plate 134. The vacuum head, designated generally 146, is moved from the position shown in FIG. 4 to the position shown in FIG. 5 by a mechanism to be described more fully hereinafter. The position shown in FIG. 5 is the closest which the vacuum head will come to the lead plate. In this position it is closely adjacent to the lead plate 134, but does not engage the plate. The vacuum is applied through the head and the resulting suction creates a sufficient force that the plate jumps from its position shown in FIG. 5 into engagement with the head as, for example, the position of the plate 134 shown in FIG. 6. In doing so, the retarding force of the spring fingers 128 is overcome. To aid in this process, the sides 22 and 24 are spaced from the bottom 26 of the chute as previously described, allowing for the passage of air therebetween.

Before moving on to a description of the adjustable stations retaining the separator elements, it is noteworthy to mention that the position of the vacuum head 146 with respect to the bottom edge of a particular plate, when viewed as in FIG. 4, is fixed. Thus, if a plate such as the plate 134 of FIG. 6, was rotated downwardly from the substantially vertical position shown to a horizontal position, the left-hand edge of the plate would always be the same fixed distance from the left-hand edge of the cup of the vacuum head regardless of the height of the plate. This will be important when considering the adjustments necessary to insure that a plate group is staked with the bottom edges co-incident with one edge of the separator elements in the stack as will be more fully explained hereinafter.

Figure 7:
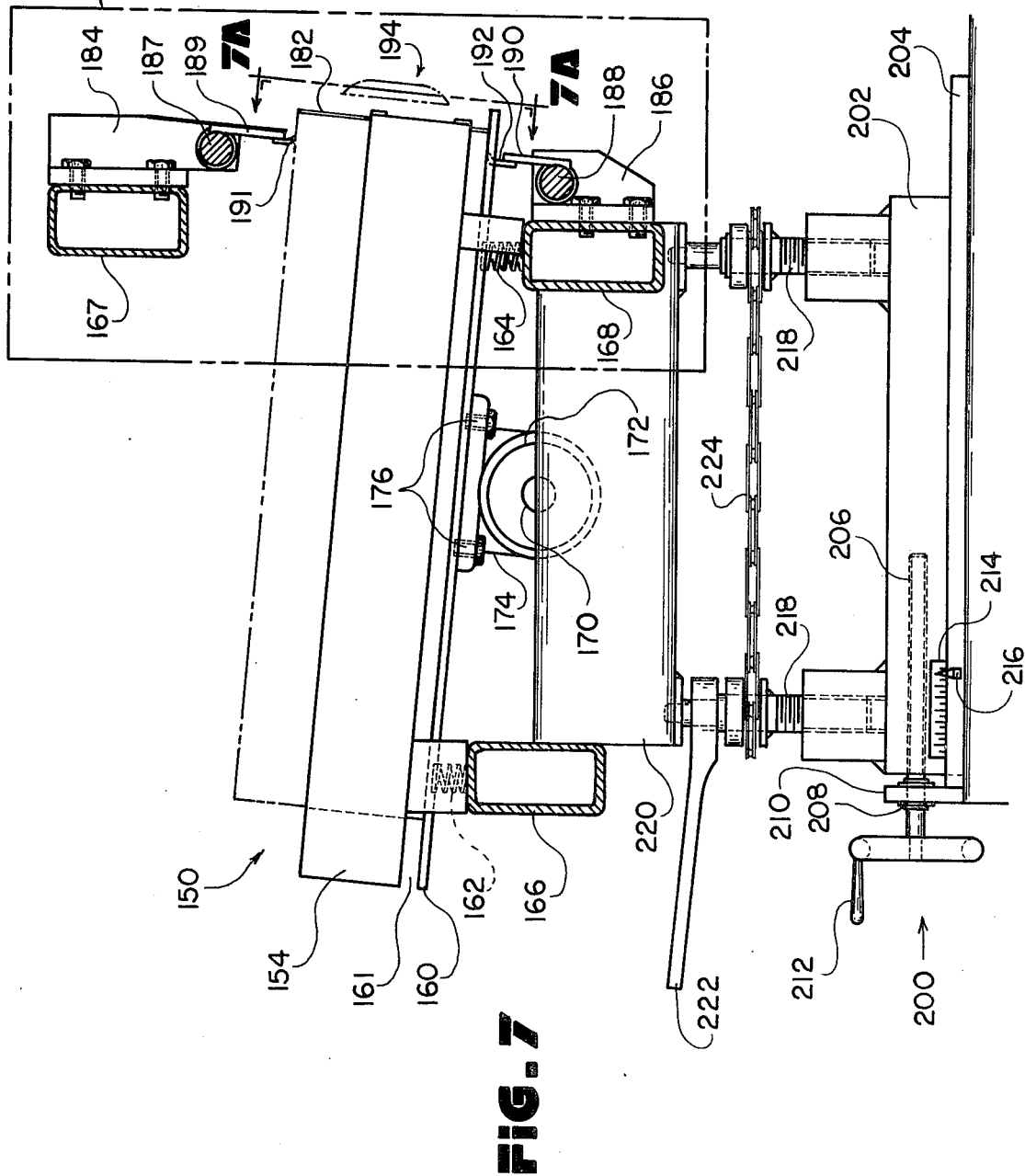
FIG. 7 is an enlarged side view of a portion of the apparatus designated 7 in FIG. 2; which has designating thereon in the broken line enclosure, a portion of the apparatus shown in FIG. 8.
Figure 8:
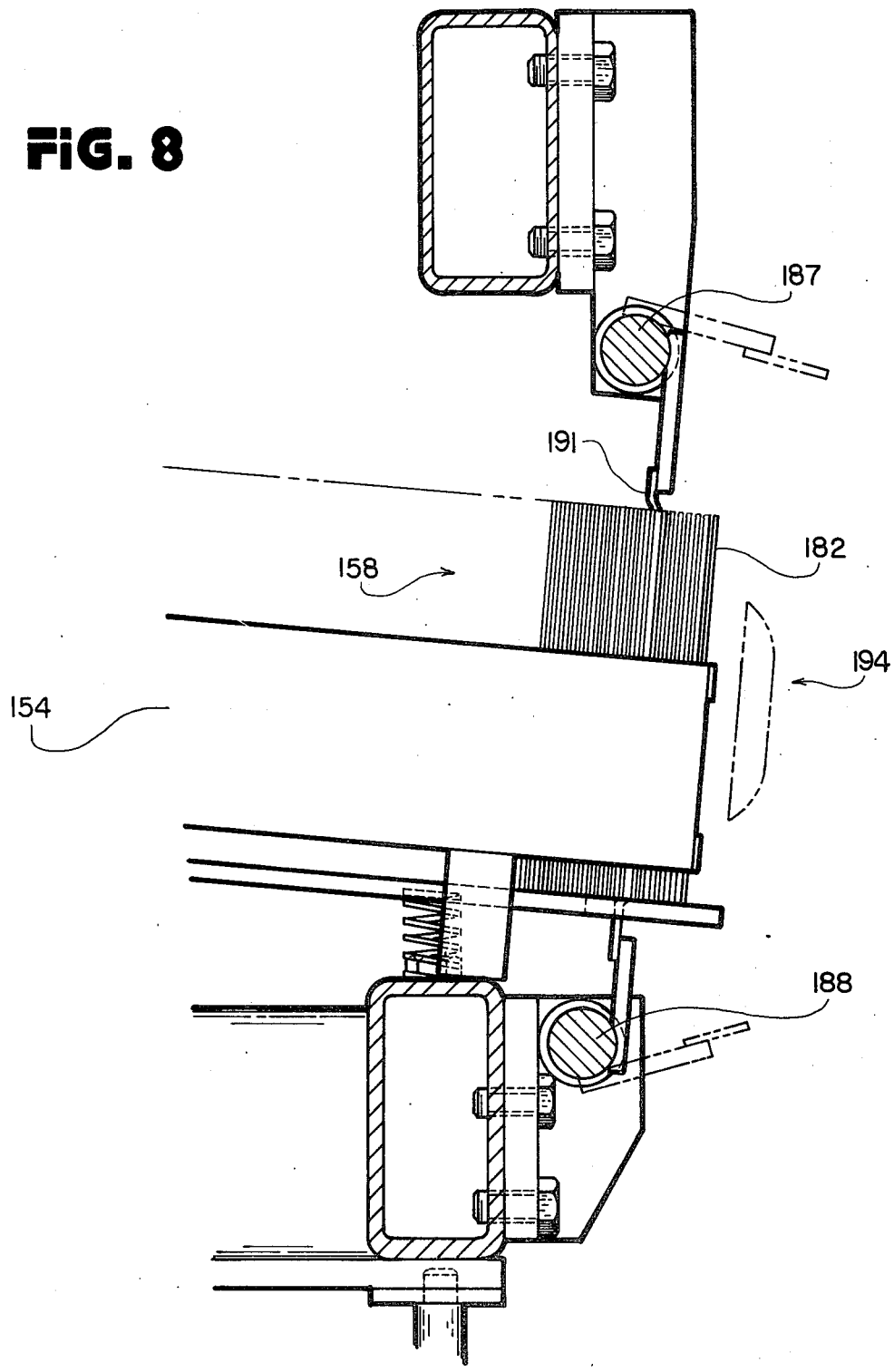
FIG. 8 is a further enlarged view of a portion of the apparatus as designated by the number 8 in FIG. 7.
Figure 9:
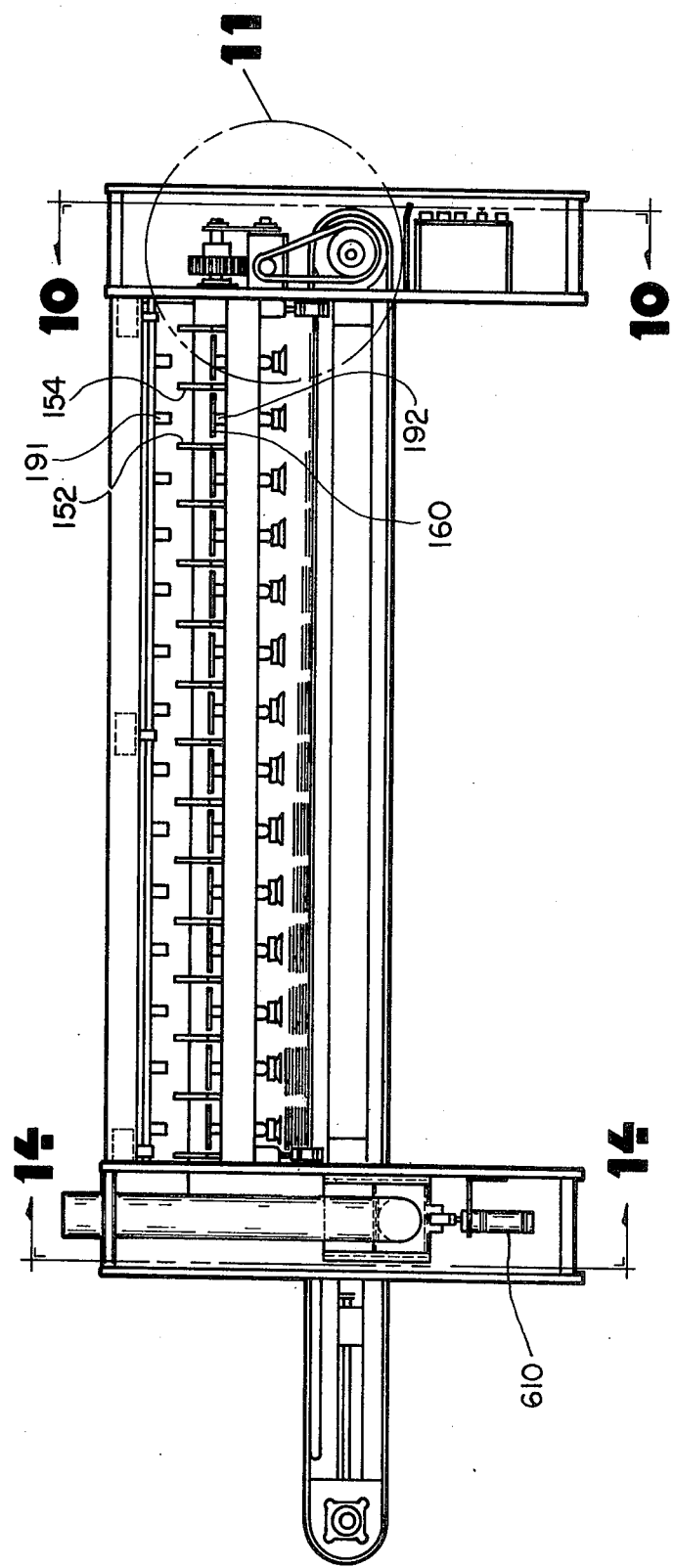
FIG. 9 is a side view taken from the opposite side of the apparatus shown in FIG. 1.

Referring to FIGS. 1 and 2, and more particularly, to FIGS. 7, 8 and 9, I will now describe the stations which handle the separators prior to stacking. A representative station is shown at 150 and comprises laterally extending sidewalls 152 and 154 forming a channel; once again positioned to slope inwardly toward the center of the machine as clearly indicated in FIGS. 2 and 7. A plurality of separators are shown in FIG. 8 designated generally 158. The separators are thin, rather flimsy elements, particularly when compared with the heavier lead plates. Furthermore, the separators vary greatly in outside physical characteristics, not only in size and thickness, but in texture and surface construction (such as ribbing). Thus, they do not stack uniformly with any degree of ease. In this embodiment as in the embodiment involving the plates, the base 160 upon which the separators rest, is spaced from the sidewalls as shown in FIG. 7. Once again, the function of this spacing (161) is to allow air currents to move in freely behing the separators and aid in the discharge process.

The base 160 is mounted on springs 162 and 164 which, in turn, are mounted on beams 166 and 168, respectively, which traverse the length of the machine and are connected to the ends mounted above the floor. Also extending the length of the apparatus is a shaft 170. A plurality of eccentrics (such as 172) are mounted thereon for rotation therewith. The eccentric travels in a housing 174 fixedly mounted to the bottom of the base 160 by any suitable means such as the screws 176. Upon rotation of the shaft 170, the eccentric 172 rotates within the housing 174 and causes the housing to move vertically, upwardly and downwardly against the action of the springs and the weight of the separators on the base 160. This creates a vibratory action within the chute and tends to shake them down evenly so that the bottom edges lie flat against the plate 160; so that they move generally to a uniformly stacked condition against the right-hand restraints at the inner terminus of the sidewalls 152 and 154. It is desirable to use a variable speed drive (not shown) for the cam vibrating mechanism for the separators, since the separators vary greatly in thickness and the various frequencies of vibration are desirable, depending upon the characteristics of the separators. These restraints are small pieces of plastic 178 and 179 (FIG. 7a) which bridge the wall and which are fixedly mounted thereto as by means of the screws 180. These pieces of plastic extend partially over and in front of and in interferring relationship with the lead separator, such as the separator 182 (FIG. 7). Four such restraints are provided; two on each wall.

Mounted above and below each station are mounting brackets 184 and 186, affixed in any suitable way to the beams 167 and 168, respectively. Mounted for rotation within these mounting brackets are shafts 187 and 188, respectively, which are driven by any suitable mechanism (not shown). Mounted through the shafts are depending mounting fingers 189 and 190, respectively, and mounted to the fingers are resilient fingers 191 and 192, respectively. As can best be seen in FIG. 8, the fingers are moved from the phantom position to the full line position along an arch which causes the resilient ends of the fingers to bend back as they begin to engage the outer group of separators, and as the rotation continues, they tend to fan or somewhat separate the leading separators and move the trailing separators into a closer relationship. Notice the close spacing of the separators 158 to the left of the finger 191 of FIG. 8, as compared to the spacing of the remaining seven separators forming the leading group most proximate to the discharge end of the chute or station. Note also on FIG. 9 that the fingers 191 and 192 are substantially, centrally disposed between the sidewalls 152 and 154. The action of the fingers in restraining the separators keeps them from piling up too much weight against one another as they are restrained by the small tabs, such as the tabs 178 and 179. Too much pressure against these tabs would cause the separtors to become locked in against them and might prevent their release as vacuum is applied to them.

As shown in phantom lines in FIG. 7, the vacuum head designated generally 194, can be positioned in close proximity, but in non-touching relation, to the leading separator 182. As the vacuum is applied through the head, the separator will jump from its restraints into engagement with the head and as long as the vacuum is applied, will remain in engagement with the head as the head is rotated to the vertical position shown in FIG. 6.

Note that in that position, the right-hand edge of the separator 182 would be referenced to the right-hand edge of the lip of the vacuum head 194. Since this is the opposite of the referenced condition with respect to the head handling the plates, the stacks could conceivably be out of appropriate referenced condition relative to plates and separators unless some adjustment was made. I have provided for that adjustment in a number of ways. For one, the vacuum heads themselves are adjustable along their axes (which will be more fully described hereinafter) to adjust the pick-up vacuum necessary at particular stations. Secondly, I have provided a means for moving the entire bed holding the chutes of separators transversely to the axis of the apparatus. This movement means is designated generally 200 (FIG. 7) and comprises a base support 202 mounted to slide upon bed 204 in response to the action of a lead screw 206 threaded into the base 202. The screw is mounted for rotation in a bearing 208 (in a bearing block 210), upon actuation by a handle 212 as will be readily apparent from the figure. The portion within the bearing, of course, does not move axially, nor does the screw, however, as the screw is rotated, the base 202 advances or retracts axially. To control the extent of such advancement or retraction, I have provided a scale 214 with an indicator 216. Upwardly extending from the base are a plurality of jack screws 218, the function of which will be more fully described hereinafter. Suffice it to say for present purposes that the jack screws support the base member 220 to which the beams 166 and 168 are affixed and therefore upon movement of the base member 202, all of the racks of separators will be moved toward or away from the center of the machine. Thus, for particular changes in separators, as for example, switching from a light separator to a heavy separator in all of the racks, it is possible to move a predetermined distance along the scale to compensate for the needed vacuum.

Figure 6:
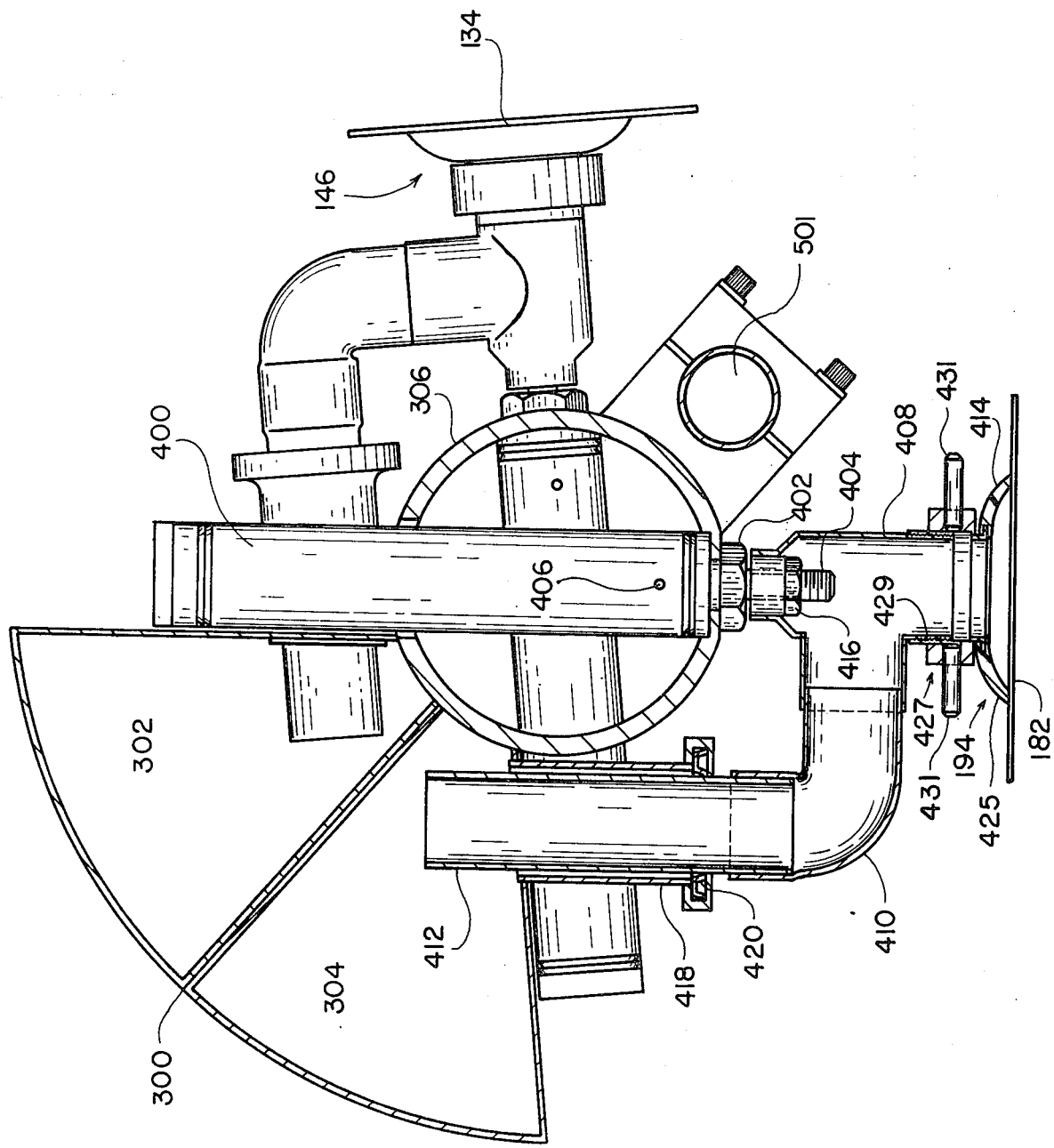
FIG. 6 is an enlarged view of a portion of the apparatus designated 6 in FIG. 2.

To compensate for the proper uniform registry or referencing of the edges of the alternating plates and separators in the stack, particularly depending upon the height of the separators, the jack screws may be adjusted, as for example, by means of the permanently affixed handle 222 and the chain 224, mounted about sprockets (not visible with the chain in place) which are fixedly connected to the jack screws. Thus, by turning the handle, the sprockets are turned as well as the jack screws and this turning either raises or lowers the base 220. As will be apparent from what has been described, this will accurately change or adjust the distance between the upper edge of the separator and the upper edge of the vacuum cup 194. Thus, the problem previously posed has been solved, since now the reference is between the left-hand edge of the separator 182 and the cup 194, as shown in FIG. 6, so as to coincide with the left-hand edge of the plate 134, as its associated cup. This allows for uniform stacking and registry of the bottom edge of the plate/separator element stacks. This is the appropriate edge to have in registry for further processing of the stacks in accordance with battery-making procedures well known in the art.

Figure 10:
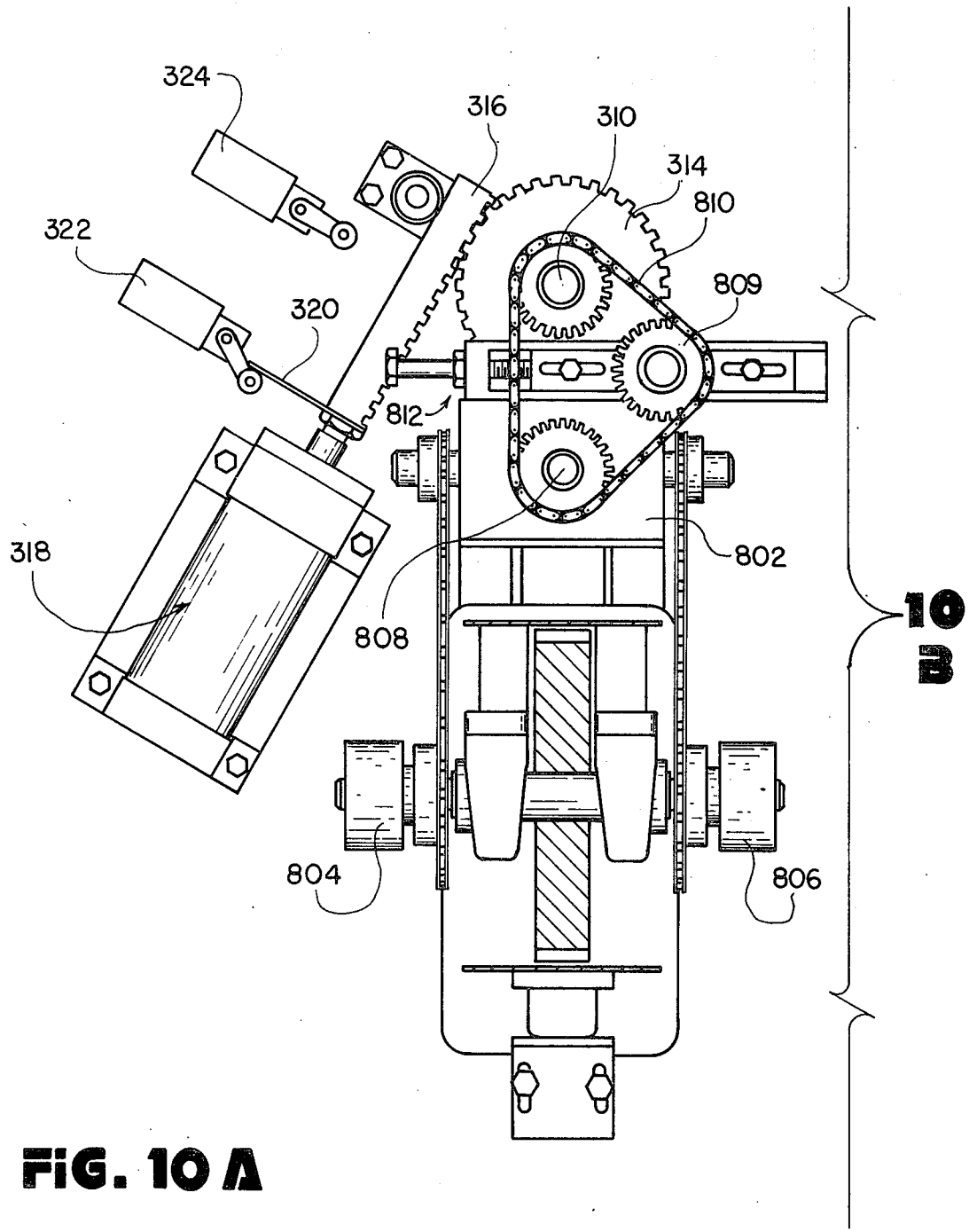
FIG. 10a is an enlarged view of the left-hand portion of the apparatus when viewed as indicated by the lines and arrows 10—10 in FIG. 9.
FIG. 10b is an enlarged view of the right-hand portion of the apparatus when viewed as indicated by the lines and arrows 10—10 in FIG. 9.

Before considering the structure and function of the vacuum head means, refer to FIG. 10b wherein a mechanism for synchronizing the action of the restraining fingers 130 and 132 is shown. The shafts 142 and 144 are mounted through the end housing of the machinery and mounted to them are identical gears 143. These gears mate with identical rack gears 145 mounted on a movable housing 147, fixedly connected to the shaft 149, which is the end of a rod extending from a piston within an air cylinder 151, which is fixedly mounted by bracket 153 to the end of the machinery. Thus, upon an appropriate air input signal to the cylinder 151, the shaft 149 extends or retracts thereby uniformly rotating the shafts 142 and 144 and moving the fingers 130 and 132 between the phantom line positions shown.

Figure 11:
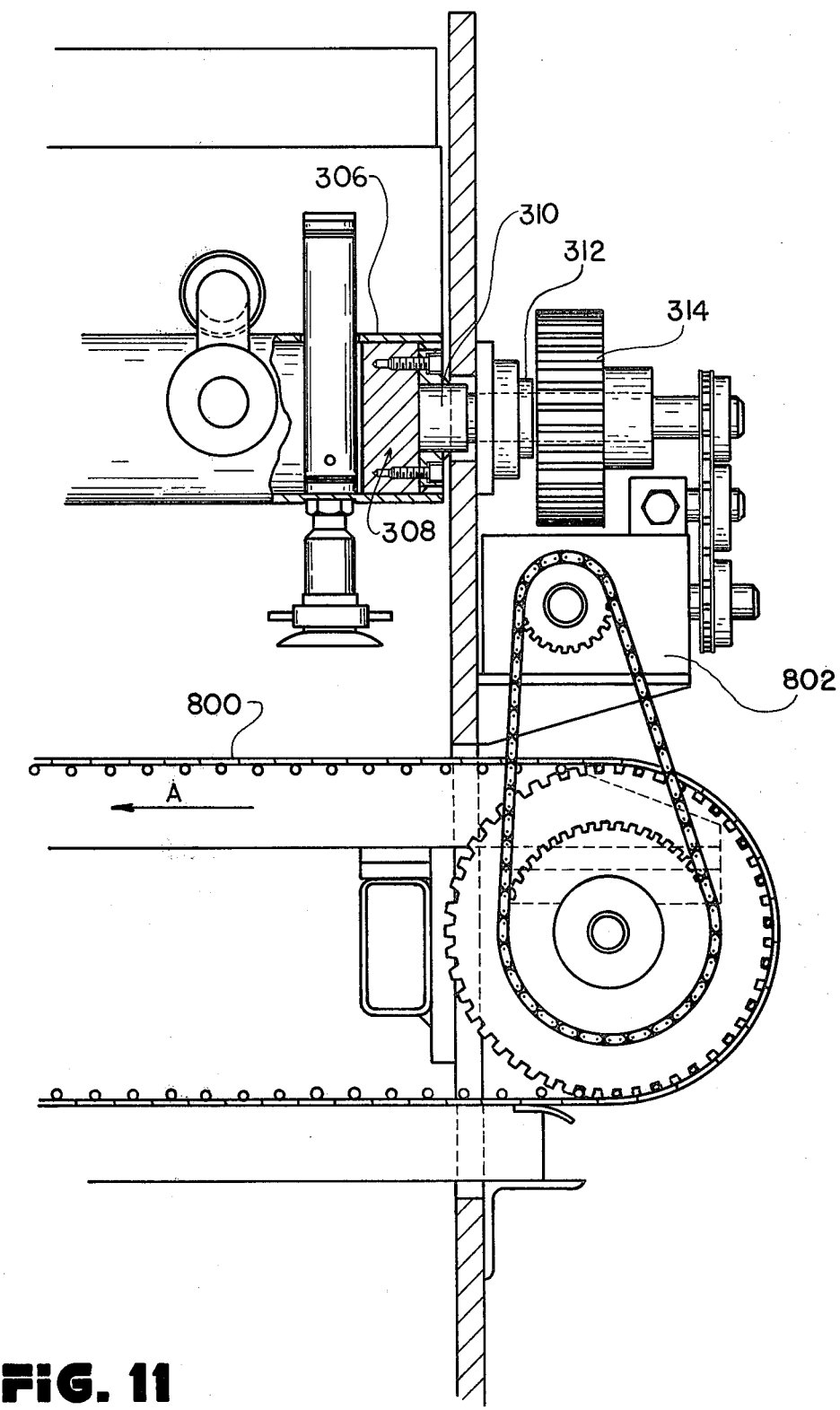
FIG. 11 is an enlarged view partially broken away of the portion of the apparatus encircled and designated 11 in FIG. 9.
Figure 15:
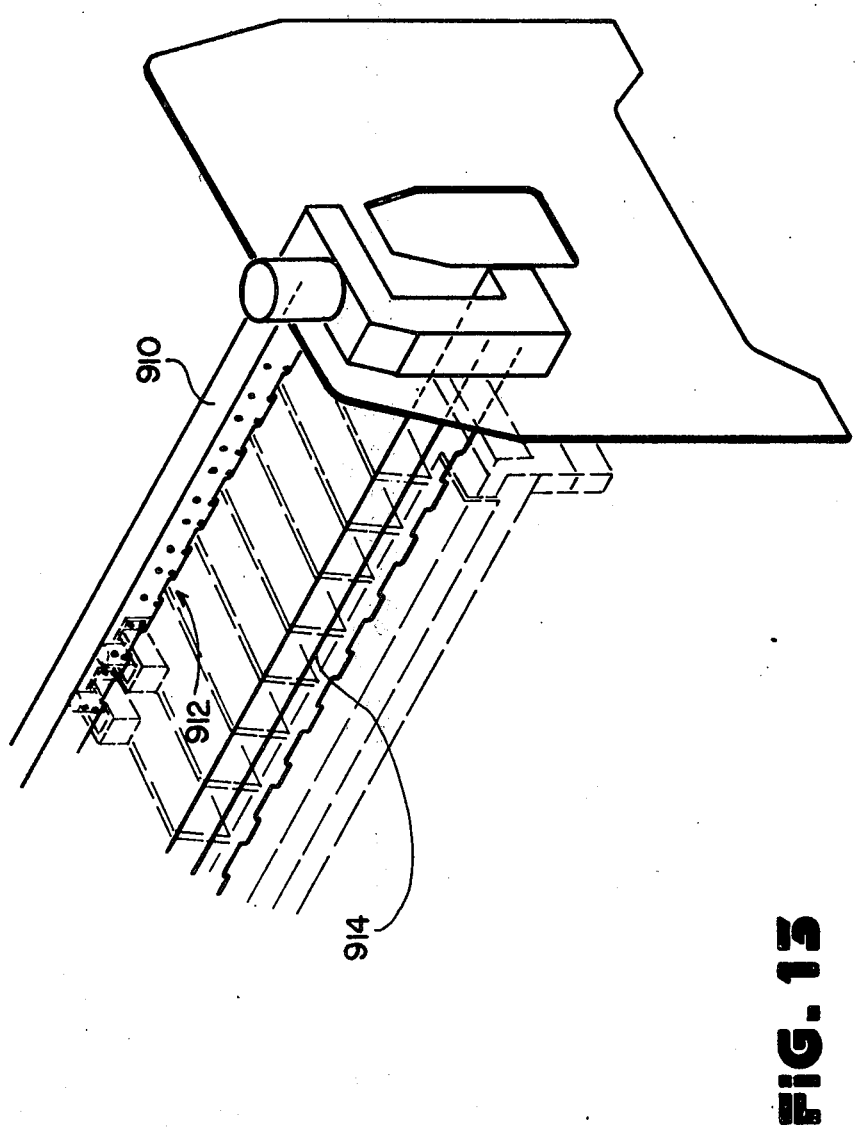

Running the length of the machine is a longitudinally extending central vacuum chamber 300 which is divided into separate pie-shaped longitudinally extending vacuum chambers 302 and 304, which are not innerconnected. The means for supplying the vacuum to these independent chambers will be described hereinafter. These chambers are mounted on the surface of a hollow central shaft 306 (FIGS. 6 and 11). This central shaft is supported by a cylindrical end block 308 which in turn is fixedly connected to a central motive shaft 310, arranged through bearings 312 so as to be connected for rotation to a drive gear 314 driven by a rack 316 (FIG. 10a) in response to air pressure supplied to a cylinder and piston arrangement designated generally 318. The rack reciprocates in timed sequence and responds to impulses generated upon appropriate sensor activities such as the engagement of the feeler 320 with the arms of the pick-up sensors 322 and 324. It is noted that throughout this application, electric power means, pneumatic power means, vacuum means, and logic circuitry are considered to be within the realm of the state of the art available and known to one skilled in the art in view of the invention disclosed herein and should be adapted to the ends of this invention, particularly in view of the disclosure of the invention in this application. Therefore, they will, generally, not be described in detail.

The reciprocation of the rack 316 rotates the gear 314 and the shaft 306 from one quadrant and then back so that the vacuum head designated generally 146 in FIG. 6 and a horizontal position as shown by the vacuum head 194 in FIG. 6. Of course, the vacuum head 194 would be opposite to the position of vacuum head 134 shown in FIG. 6 slightly above a horizontal line, when it (194) moves its vertical position. That is, if it were shown in FIG. 6, it would be on the left-hand side in its alternate position. In that position, it would be in a position necessary to retract a separator, such as the separator 182.

The shaft 306 runs the length of the apparatus and is supported at both ends. Positioned along its length are a plurality of adjustable vacuum head means. These means comprise a piston and cylinder arrangement, a resilient vacuum head, a means for adjusting the position of the vacuum head relative to its axis and various other means for performing sundry functions which will be more fully explained hereinafter. Referring particularly to FIGS. 2 and 6, it will be noted that each of the vacuum head means comprises a cylinder such as the cylinder 400, which is disposed to pass through one wall of the hollow circular shaft 306 and be affixed to the other wall on a line diametrically disposed therethrough; as for instance by the nut 402 engaging a portion of the housing of the cylinder 400. Extending from the cylinder is a piston shaft terminating in a threaded portion, such as 404. The piston shaft extends from the piston within the cylinder and it will be noted from the single hole 406 that the cylinder is a single acting one in which pressure drives the piston outwardly from the cylinder and the piston is thereafter returned by a spring means mounted within the cylinder (not shown) when the pressure is removed. Such a device is known as a single acting spring return piston and cylinder. Mounted on the end of the piston shaft is a fitting 408 made of copper or other suitable material which is generally in the shape of a "T". Connected to the stem of this "T" is a copper elbow 410 which can be affixed thereto as by means of soldering in order to provide an air-tight connection. Extending from the other end of the elbow 410 is a short length of copper tubing 412, also soldered. This arrangement provides a passageway from the chamber 304 for communicating ultimately with the cup 414 at the end of the "T" opposite to the portion of the "T" which is connected to the piston rod 404. At the end which is connected to the piston rod 404, the "T" necks down as clearly shown in FIG. 6 and is soldered to a bushing which is threaded onto the piston rod 404 and thereafter a nut 416 is applied in order to retain the bushng and "T" arrangement. Since the connections are all soldered, it will be apparent that when the piston rod extends from the cylinder, the entire vacuum head means likewise extends.

A housing 418 extends concentrically with the short length of tubing 412 and envelopes it. In order to maintain a vacuum between this housing which is sealingly engaged with the walls forming the chamber 304, an annular washer 420, U-shaped in cross section, is provided. Since a vacuum is produced in the chamber 304, the U-shaped section will tend to open outwardly and grip the external surface of the member 412 thereby providing an effective seal. At the same time, it will be understood that the maximum extension of the rod 404 will not extend the tubing 412 beyond the limits of the member 418 so that the vacuum is always maintained. In this manner, a constant vacuum will be obtained even though the suction head 194 is moved toward and away from the station at which it is to pick up a separator such as the separator 182.

For sealing purposes and in order to maintain the vacuum even though applied to an irregular surface such as the surface of a plate or separator, the suction head itself is provided with a cup, such as the cup 425, which has a feathered external lip of resilient material thereby providing maximum flexibility for engaging the surface of the objects to be retained thereon.

The position of this cup with respect to the remainder to the T-shaped fitting 408 may be adjusted by turning the housing designated generally 427 rotatively with respect to the fitting upon which it is threaded (as shown at 429) thereby advacing or retracting it. This turning can be accomplished by means of the pins 431 extending from the housing 427. Once adjusted, the head can be fixed against further turning by any suitable means, such as a set screw (not shown). In this manner, the heads may be individually adjusted with respect to the particular element station.

It will be appreciated that the manifolding provided by the chambers 302 and 304 provides for uniform suction through the suction heads. Each of the remaining heads is identical to to the one just described and the overall arrangement provides a system whcih is dynamically balanced in terms of the forces necessary during the intermittent rotation in opposite directions, since the pistons are mounted through the central shaft.

A common air supply is provided through a manifold 501 (FIG.6) and this supplies air to the pistons such as the piston 400 for extension of the piston rod and application of the vacuum to the plates or separators as the case may be.

Figure 14:
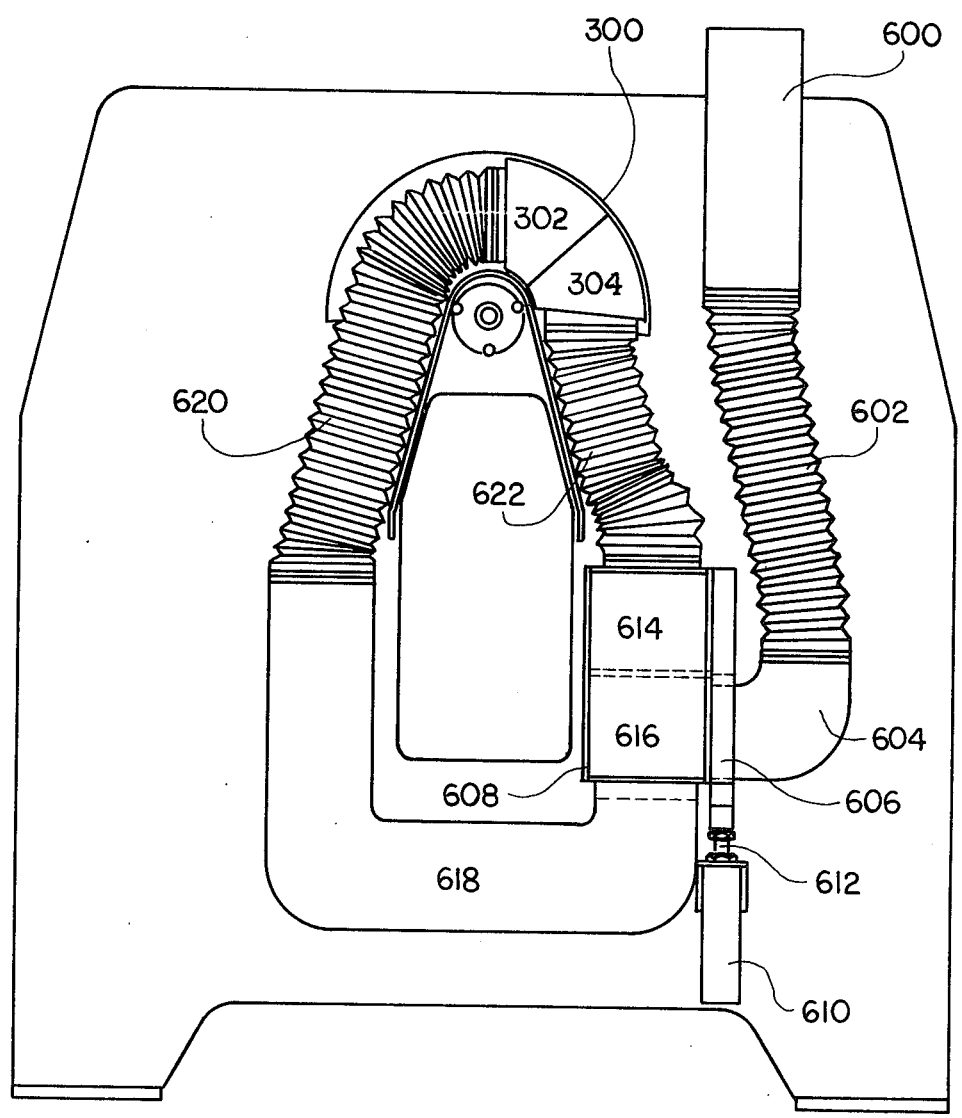
FIG. 14 is an end view on an enlarged scale of a portion of the apparatus shown in FIG. 12.

The vacuum manifolding is controlled by means of a box slide valve shown particularly in FIGS. 12 and 14 with reference to FIG. 9. The output of the blower 900 which provides the vacuum is divided into two tubes 901, 902, which go to the right and left hand sides, respectively, of the machine (when viewed as in FIG. 14). On the right-hand side there is a gauge 999 and on the left-hand side there is a damper 904. The right-hand tubing is connected by a piece of tubing 600 into a bellows tubing 602 and then into an elbow 604. The elbow is fixedly mounted in a slide plate 606 and communicates with the dual-chambered box 608. The slide plate is moved by a piston 612 extending from a fixedly mounted cylinder 610. Thus, as the cylinder activates the piston to extend from the position shown in FIG. 14, it moves upwardly in order to supply a vacuum to the upper chamber 614 as opposed to the lower chamber 616. In the position shown in FIG. 14, the vacuum is provided through the connecting conduit 618, the bellows secton 620 and the manifold 302 to the plate-side vacuum heads; that is the vacuum heads which serve the plate stations. If the slide plate 606 is moved to the upper position, it will supply a vacuum through the chamber 614 and the bellows 622 to the chamber 304, which supplies vacuum to the heads adjacent the separator stations. (The vacuum source is not shown in FIG. 1 for the sake of clarity).

The gauge 999 regulates the amount of vacuum to the pick-off stations. When there is an excess of vacuum, the left-hand side 902 (FIG. 12) will operate for two purposes to be more fully explained. A top duct 910 runs the length of the machine and has a series of small slots (designated generally 912) along the inner edge. A lower duct 914 is also provided with a series of slots along the edge. The portion 902 is connected to a header 918 which is connected to a "C" shaped manifold 920, which is connected to the ducts 910, 914. The slots in the ducts increase in size the further they are away from the vacuum source, since a greater vacuum is required to pull the dust and foreign materials in the air into the duct. This dust collection is provided only by excess vacuum, that is, that vacuum not required by the particular vacuum heads lifting off plates and separators. Obviously, where vacuum heads are not being used to lift off plates of separators such as in the case of stacks being made with less plates and separators then the total capacity of the machine (that is, not all of the chutes are full), there will not be as much vacuum required and the flapper valve 904 will open more in order to provide more vacuum to the dust collection means.

By adjusting the pressure on the cylinder 922 controlling the piston and thereby controlling the position of the flapper valve (note the rack and pinion attached to the piston in FIG. 12a) within the duct, the amount of vacuum to the pick-off stations can be adjusted. Here again the gauge provides the necessary datum line to make this adjustment. This maximizes the efficiency of the blowers. The dust collection draws the dust downwardly and away from the machine operator.

By watching the gauge, the operator can determine visually how much vacuum is actually necessary to run the machine, depending on the number of pick-off stations being used. The upper duct, by means of the holes along the edge, draws dust upwardly and away from the machine operator, whereas the lower duct draws dust downwardly and away from the machine operator; particularly dust which is collected in the trough.

Note that the plate which covers the box-shaped manifold with the divider, must be in sealed engagement with it even though it is in sliding engagement with the face providing the openings thereto.

The problem with the vacuum is that when the machine is not making as many elements in a stack as it is capable of making (that is when it is not working as many stations), some of the vacuum cups are open to the atmosphere. At that time, a bigger portion of the output from the blower is required in order to provide a constant vacuum for the cups that are being used.

During operation of the machine, the cups are advanced toward either the separators and the plates and are normally positioned in close proximity to them. Of course, this must be adjuted depending upon the particualar plates and separators being used and the amount of vacuum being used. Once adjusted, however, it will be noted that the length of the stroke of the piston is always the same so that as the stack builds there is additional pressure. That is, normally after the separator or plate has jumped to the cup, it is maintained in intimate contact with the lip of the cup so that as it is swung around to the horizontal position from the vertical position, it maintains its relative position on the cup. This is important for registry as previously described. Then the piston extends downwardly to gently lay the plate or separator onto the stack during formation. Once it has reached the full extent of its downward stroke, it is timed so that the vacuum is discontinued and the plate or separator simply remains in place as the piston is withdrawn and the shaft is rotated back to its alternte position. The length of the stroke is not the same because as the stack builds the stroke gets shorter. The pressure is uniform at approximatey twenty-five pounds per square inch, this, of course, allows for variation in the thickness of the plates and variation in the thickness of the separators without any adjustment of the machine being necessary.

In FIG. 10a, there is shown an end view of the drive mechanism. The upper shaft 310 is the central drive shaft for the stacker vacuum means. That swing shaft 310 is given a reciprocating motion by the large rack and pinion previously described. That motion is related to the drive motion for the belt 800 (FIG. 11) which holds the stacks. Because the upper shaft reciprocates, and the belt always has to be driven forward (in the direction of the arrow A), whether the reciprocation is in one direction or the other, I have coupled that shaft through a universal gear box 802 (FIG. 10a) to a plurality of cam clutches 804, 806. When the gear 314 is turned in one direction, it turns the gear 808 in the same direction, and, through the gear box 802, it turns the cam clutch which drives the belt. When the rotation of the gear is reversed, that cam clutch disengages, and the one on the other side engages to drive the belt forward.

Since precise synchronous movement is required of the belt 800 in order to keep the stacks exactly equal as they go down and to avoid any cumulative error; and also to provide for error which would be caused by wear, a three-sprocket arrangement with an adjustable idler 809 is used engaging the drive chain 810. Normally such chains have a certain slack factor in them. In order to make this slack/idler gear system work, I select a gear tooth arrangement which would normally drive the lower gear 808 to such an extent that the belt 800 would advance too far. It is then possible to use the chain slack on the idler to compensate for this. In other words, there is a looseness in the system which applies in both directions and thus the bottom gear 808 will not drive the belt 800 too far, but rather just exactly the right amount. This compensates for wear in the following manner: as any part of the gear train wears, one can then tighten up on the slack by advancing the idler gear 809 to the right by means of the screw and slide bolt designated generally 812 (upon which the idler is mounted) and thereby achieve perfect synchronization.

With this type of arrangement, even though the primary gear 314 and rack did not function perfectly, as for example, when the air pressure drops off, the advancement of the belt will precisely mate in turns of synchronization and slack off itself so that the element will be dropped in an even stack.

It will be understood that various changes in the details, materials and arrangement of parts which have been herein described and illustrated in order to explain the nature of this invention may be made by those skilled in the art within the principles and scope of the invention as expressed in the following claims.

In particular, once the principles of my invention are understood by the previous description in the specification of this application, changes in particular parts might be made by those skilled in the art which were heretofore not possible in view of the development of the art to date. While numerous attempts have been made to solve the problems of providing a stacker of the type described, none have been successful. I have provided a means for gently, accurately and consistently removing battery plate elements and battery separator elements from racks and depositing them in accurately-aligned stacks by a vacuum disposition means which approaches, but does not touch, the elements in their racks. In part, this means has been made effective by a number of the adjustments and controls which I have previously described and which can generally be referred to as: means for retaining and presenting for disposition battery plate elements; means for retaining and presenting for disposition battery separator elements; means for adjusting the position of the vacuum heads relative to said last-mentioned means; means for adjusting, regulating and controlling vacuum and its application throughout the machinery; and means for synchronizing the operation of the machinery to produce accurately-aligned stacks of elements.

In accordance with the preferred method of operation of the apparatus in accordance with my invention, a constant vacuum is provided to a plurality of adjustably positioned vacuum heads dynamically mounted through a central shaft and in communication with separate vacuum chambers. The shaft rotates less than 360° and then reciprocates back to its original position. The elements are aligned in their racks in accordance with the particular requirements of the physical characteristics of the particular elements. All of the elements are positioned on edge and are inclined slightly toward the center of the machine. In the case of battery plates, means are provided for selectively presenting only the first plate in a stack to the vacuum head means. In the case of battery elements such as separators, means are provided for relieving the build-up pressure against the first element at the discharge station and separate tab means are provided for retaining the flexible elements so that the vacuum provided is just sufficient to allow the flexible elements to bow outwardly and jump from their stations past the tab means when a perfect vacuum is provided. In the case of both battery plates and battery separators, the design of the rack is such that air currents induced by the suction of the vacuum are generated around, under and behind the element to be pick-off by the vacuum head.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. An apparatus for picking up and interlaying in stacks battery plate elements and battery separator elements from different sources, comprising: a plurality of sources of elements for sequentially presenting the surface of the lead element in each source toward a pick-up means at pick-up stations where the presented lead element will be disengaged from the source and be picked up; vacuum head means for applying a vacuum to said elements, movable toward and away from the stations at which element surfaces are presented; said sources constructed to provide for the presentation of the lead element to the vacuum head means in an area wherein air currents can envelope said element upon application of vacuum to the presented surface; retaining means positioned in interferring relation to the egress of said lead elements from said sources toward said vacuum head means; said retaining means with respect to said battery separator elements interferring with the egress of said battery separator elements only to the extent of not permitting them to depart from said stations in response to the means presenting them, and not to the extent that it would prevent a vacuum from withdrawing the lead separator element past said retaining means in the direction of presentation; and means for moving and positioning the vacuum head means in sufficiently close nontouching proximity to the presented element surfaces at stations that the negative pressure provided by the vacuum applied through said vacuum head means, alone, draws said presented elements from their sources past said retaining means into engagement with the vacuum head means whereby said elements are picked up by said vacuum head means; and element receiving means for receiving elements thereafter deposited by said vacuum head means to form said interlaid stacks.

2. The invention of claim 1 wherein said element source means has means for positioning each of said elements so that they rest upon an edge and are inclined with respect to said edge toward the vacuum pick-up means.

3. The invention of claim 1 wherein the structure comprising said sources of elements comprises sidewalls proximate to the sides of said elements, and a base upon which said elements rest on edge, which base is spaced from said sidewalls.

4. The invention of claim 1 wherein said retaining means with respect to said battery plate elements are yieldable.

5. The invention of claim 1 wherein means are provided for adjusting the disposition and force of the lead element against said retaining means retaining said battery separator elements, comprising resilient fingers movable from a position of non-engagement with said separator elements to a position of engagement with said separator elements along a path which causes the resilient ends of said fingers to bend back as they engage the group of separators closest to presentment in the stack of separators along their edges, and to fan or separate the leading group of separators and move the trailing group of separators into closer relationship.

6. The invention of claim 4 wherein said yieldable retaining means with respect to said battery plate elements comprises leaf spring means retaining an edge of said battery plate element against egress from its station.

7. The invention of claim 4 wherein said retaining means with respect to said lead battery plate elements, interfere with the egress of said lead battery plate elements only to the extent of not permitting them to depart from said stations in response to the means presenting them, but permitting the vacuum to draw the lead plate element past the retaining means by flexing said yieldable retaining means.

8. The invention of claim 1 wherein means are provided to engage a plurality of battery plate elements and exert a force along the upper edges thereof to push them forward in the direction of presentment within the said sources into closer alignment with one another in the direction of presentment.

9. The invention of claim 1 wherein means are provided for dividing the lead battery plate element from the retaining elements and for physically retaining said remaining elements against the action of said vacuum.

10. The invention of claim 9 wherein said last-mentioned means is adjustably positionable and resilient to accommodate variations in the upper edges of said battery plate elements.

11. The invention of claim 1 wherein the vacuum provided to the plurality of vacuum head means is provided through longitudinally extending chambers in a beam extending the length of the apparatus; one such chamber being provided for the vacuum head means associated with the removal of plate elements and another such chamber being provided for the vacuum head means associated with the removal of said separator elements; each of said chambers having means connected to a valve means; said vacuum being supplied by a vacuum source connected to said valve means communicating alternately with said chambers; and means to actuate said valve means to provide vacuum to one chamber or to the other chamber so as to apply a vacuum to either one set of vacuum head means servicing the battery plate elements or to the other said vacuum head means servicing the battery separator elements; said valve comprises a multi-chambered device having a plate in sliding engagement with the opening communicating to each chamber; said plate retaining a connection to a flexible member from said vacuum source in fluid flow communication therethrough and said plate engaging means for moving said plate in synchronization with the movement of said vacuum head means toward and away from said sources; said beam being reciprocated about a longitudinally extended axis in response to said means for moving and positioning the vacuum head means to pick off said elements; and means are provided engaging said battery separator element sources to vertically adjust their position with respect to their associated vacuum head means.

12. The invention of claim 3 wherein means are provided to variably vibratorally stack said separator elements against said retaining means.

13. The invention of claim 1 wherein said vacuum head means comprises a cup-shaped member made of flexible material feathered toward its outermost ends, said cup being adjustably positioned on a tubular member connected for movement to the terminal end of a piston rod extending from a piston within a single acting cylinder, said tubular member being inter-connected by conduit means to a vacuum chamber, said conduit means comprising a conduit disposed in sliding engagement with a seal maintained and supported in a bracket whereby said conduit is freely extendable and retractably within said bracket and is maintained in vacuum communication with said chamber.

14. The invention of claim 13 wherein said seal is annular and U-shaped in cross section and the U-shaped portion thereof has its outer edges facing away from the source of the vacuum so as to draw outwardly and into engagement with the walls of said conduit means upon application of a vacuum thereto.

15. The invention of claim 13 wherein said cup may be adjusted and means are provided for fixedly retaining said cup in a plurality of positions along an axial path relative to said piston rod.

16. The invention of claim 1 wherein said element receiving means comprises an incrementally advancing conveyor, and means of providing for synchronizing the indexing of the movement of said conveyor with the movement of said vacuum head means for disposition of said battery elements thereon, wherein said synchronous means comprises a plurality of cam clutches engaging said conveyor means to drive said conveyor means in one direction only upon reciprocation of said vacuum means.

17. The invention of claim 16 wherein said synchronization means comprises a plurality of gears inner-connected by a chain mechanism and having engaged therewith an idler mechanism to take up the slack in said chain; said gears normally having a gear ratio which would overdrive said gear such that said conveyor means would over-travel and become out of synchronization were it not for the slack adjustment of said idler gear.

18. A method of picking up and interlaying into stacks battery plate elements and battery separator elements from different sources of such elements, comprising the steps of: providing a plurality of sources of elements with the elements arranged on edge for sequentially presenting the lead surface of the lead element from each source to be picked up; positioning a retaining means in interferring relation to the lead element in each stack to retain said element in said source prior to being acted upon by a vacuum force; picking up only the presented elements and depositing them onto a conveyor in the form of interlaid stacks by withdrawing the elements from said sources past said retaining means; said picking up of the elements comprising providing a vacuum to a vacuum head means and moving the head means toward the stations at which the presented elements are to be encountered; arranging the lead elements with respect to the approaching vacuum head means so as to allow air currents to be generated about said elements to dislodge them from their sources and cause them to jump to the vacuum head means; followed by movement of the head means away from the stations for deposit of the elements onto a conveyor; with the movement of the head means upon its approaching the elements that are about to be picked up being such that the head means is brought into close but non-touching proximity to the presented element surfaces at the stations; with the negative pressure that is provided by the vacuum alone effecting the withdrawal of the elements from their sources to said vacuum head means for deposit thereafter onto the conveyor.

19. The invention of claim 18 including the step of inclining said elements toward said vacuum head means with respect to the edge upon which said element rests.

20. The invention of claim 18 including the step of adjusting the vertical position of the stations holding the separator elements with respect to the vacuum head means associated therewith so as to provide for alignment of one edge of said separator elements on disposition in said stacks with the lower edge of said plate elements.

21. The invention of claim 18 wherein prior to presenting the lead element for disposition onto its associated vacuum head means, the step of engaging a plurality of said plate elements along their upper surfaces by first forcing a plurality of said elements toward a means for retaining said elements within said station, then dividing the first of said elements from the remaining of said elements by positive means and retaining the remainder of said elements within said station while said initial means for positively retaining said elements are removed and providing a yieldable means retaining the upper edge of said lead element once it has been divided from said remaining elements.

* * * * *